United States Patent [19]

Price, Jr. et al.

[11] Patent Number: 5,265,739
[45] Date of Patent: Nov. 30, 1993

[54] DOUBLE DENSITY STORAGE RACK SYSTEM FOR DATA TAPE CARTRIDGES

[75] Inventors: Macy J. Price, Jr., Louisville; Laurence G. Ball, Denver; Andrew W. Wildhaber, Thornton, all of Colo.

[73] Assignee: Engineered Data Products, Inc., Broomfield, Colo.

[21] Appl. No.: 6,431

[22] Filed: Jan. 21, 1993

Related U.S. Application Data

[63] Continuation of Ser. No. 786,087, Oct. 31, 1991, Pat. No. 5,193,696, which is a continuation-in-part of Ser. No. 679,796, Apr. 3, 1991, abandoned, which is a continuation-in-part of Ser. No. 551,131, Jul. 6, 1990, Pat. No. 5,072,838, which is a continuation-in-part of Ser. No. 343,952, Apr. 26, 1989, abandoned.

[51] Int. Cl.$^5$ .............................................. A47F 5/00
[52] U.S. Cl. ...................................... 211/162; 211/41; 312/201
[58] Field of Search ................. 211/41, 189, 208, 88, 211/103, 190, 192, 162; 312/8, 15, 10, 12, 201, 198, 245, 246; 206/387; 248/221.3; 188/40, 63, 62; 16/DIG. 16, DIG. 20

[56] References Cited

U.S. PATENT DOCUMENTS

| | | | |
|---|---|---|---|
| 590,544 | 9/1897 | Hancock | 188/40 |
| 1,136,710 | 4/1915 | Paulauski | 188/63 |
| 1,507,747 | 9/1924 | Mayfield | 16/DIG. 20 |
| 2,269,196 | 11/1956 | Guilbert, Jr. et al. | 312/333 X |
| 3,439,778 | 4/1969 | Garbers et al. | 312/198 X |
| 4,427,244 | 1/1984 | Castagna | 312/198 X |
| 4,432,589 | 2/1984 | Sattel | 312/198 |
| 4,600,107 | 7/1986 | Price et al. | 211/41 |
| 4,615,449 | 10/1986 | Naito et al. | 211/162 |
| 4,657,317 | 4/1987 | Gemma | 211/162 X |
| 4,759,676 | 7/1988 | Hammond | 108/51.1 X |
| 5,062,535 | 11/1991 | Potter | 211/162 |
| 5,072,838 | 12/1991 | Price, Jr. et al. | 211/162 |
| 5,193,696 | 3/1993 | Price, Jr. et al. | 211/162 |

Primary Examiner—Blair M. Johnson
Attorney, Agent, or Firm—Glenn L. Webb

[57] ABSTRACT

A storage rack system for providing high density storage of data cartridges. The storage rack system includes high density center racks having storage capability on opposing sides of the racks. Movable racks having upper rollers recessed below the plane of the upper surface of the movable racks and lower rollers are mounted on the system on both sides of the center racks. The movable racks allow access to at least one column of tape cartridge holders supported on the center racks. Brake members are resiliently mounted on the lower surfaces of the outer movable racks enabling the movable members to come to a complete stop without excessive jarring of the racks or tape cartridge holders.

15 Claims, 6 Drawing Sheets

DOUBLE DENSITY STORAGE RACK SYSTEM FOR DATA TAPE CARTRIDGES

This is a continuation of application Ser. No. 07/786,087, filed Oct. 31, 1991.

RELATED APPLICATIONS

This application is a continuation of Ser. No. 07/786,087 filed Oct. 31, 1991, U.S. Pat. No. 5,193,696 which is a continuation-in-part of U.S. patent application Ser. No. 07/679,796, filed on Apr. 3, 1991, abandoned, which is a continuation-in-part of U.S. patent application Ser. No. 07/551,131, filed on Jul. 6, 1990, U.S. Pat. No. 5,012,838, which is a continuation-in-part of U.S. patent application Ser. No. 07/343,952, filed on Apr. 26, 1989, abandoned.

BACKGROUND OF THE INVENTION

1. Field of the Invention

This invention relates to the field of storage rack systems for magnetic data tape cartridges.

2. Statement of the Problem

Large information systems utilizing computers are requiring more and more data cartridge storage cartridges. This correspondingly requires more storage area for these cartridges. Since there is typically only a limited amount of physical space allotted to the storage of the data cartridges, there is increasing pressure to better utilize the space available for the storage of data storage cartridges.

One approach to augmenting the storage capacity for tape cartridge computer systems is to provide racks for retaining tape cartridge storage holders. Tape cartridge holders normally hold a number of tape cartridges for ease of transportation of the cartridges. These tape cartridge holders are then mounted on shelves in a rack until needed.

One such example of this type of system is disclosed in U.S. Pat. No. 4,600,107, issued to Macy Price et al. and assigned to the assignee of the present invention. This system uses a rack having vertically spaced shelves to store holders which can hold up to twenty tape cartridges. However, there is still a need to provide even more storage capacity within the limited area available for storage of the tape cartridges.

Thus, a problem exists in providing storage capacity within a limited area for magnetic data storage cartridges.

3. Solution to the Problem

This problem and others are solved by the storage system of the present invention. The present invention provides a storage rack system for securing a plurality of tape cartridge holders in a high density capacity.

The present invention provides a rack system that increases the capacity of the racks without substantially requiring additional space.

The present invention further provides a rack system that is easily expandable.

The present invention further provides a rack system that can be tailored to the capacity requirements and site conditions.

These and other solutions are provided by the present invention as set forth in the accompanying description and drawings.

SUMMARY OF THE INVENTION

The present invention provides a storage rack system for providing high density storage of data cartridges. The storage rack system includes a high density center rack having storage capability on opposing sides of the rack. The center rack supports tape cartridge holders from the rear of the holders in order to store the holders in close proximity to one another. A plurality of center racks can be affixed to one another to increase the storage capacity.

An upper roller guide is affixed to the upper surface of the center racks on both sides of the racks. A lower extension member is secured to the lower surface of the center racks having an upstanding track extending parallel to the center racks. A brake engaging member is mounted on the lower extension member near the outer ends of the rack system.

Movable racks having upper rollers engaging in the upper roller guides of the center racks and lower rollers engaging on the tracks of the lower extension members are movably mounted on the rack system. The upper rollers are mounted recessed below the plane of the upper surface of the movable racks. This minimizes the height of the system without sacrificing any storage capacity. The movable racks also support tape cartridge holders by the rear of the tape cartridge holders to store the tape cartridge holders in close proximity to one another.

The movable racks are mounted on either or both sides of the center racks so that at least one column of tape cartridge holders supported on the center racks are accessible. The movable racks can then be moved along the upper roller guides and the lower track so any desired column of the center racks can be accessed for cartridge entry and removal.

Brake members are resiliently mounted on the lower surfaces of the outer movable racks. The brake members have tapered brake pads on the lower portion of the brake members which engage in tapered surfaces formed on the brake engaging members mounted on the lower extension members. The tapered surfaces and the resilient mounting of the brake members enable the movable racks to come to a complete stop without excessive jarring of the racks or tape cartridge holders. Resilient bumpers attached on the sides of the movable racks provide damping between the movable racks to reduce collision damage between the racks.

These and other features of the present invention will be evident from the detailed description of a preferred embodiment taken in conjunction with the drawings.

DETAILED DESCRIPTION OF A PREFERRED EMBODIMENT

The present invention provides a storage rack system for providing high density storage of data tape cartridges. This application is a continuation-in-part of U.S. patent application Ser. No. 07/679,796, filed on Apr. 3, 1991 and also a continuation-in-part of U.S. patent application Ser. No. 07/551,131, filed on Jul. 6, 1990 which is a continuation-in-part of U.S. patent application Ser. No. 07/343,952, filed on Apr. 26, 1989, abandoned.

One possible preferred embodiment of the present invention is illustrated in FIGS. 1-6. It is to be expressly understood that this descriptive embodiment is for explanatory purposes only and is not meant to limit the scope of the claimed invention. Other embodiments and modifications are considered to be within the range of the inventive concept.

Figure 1:
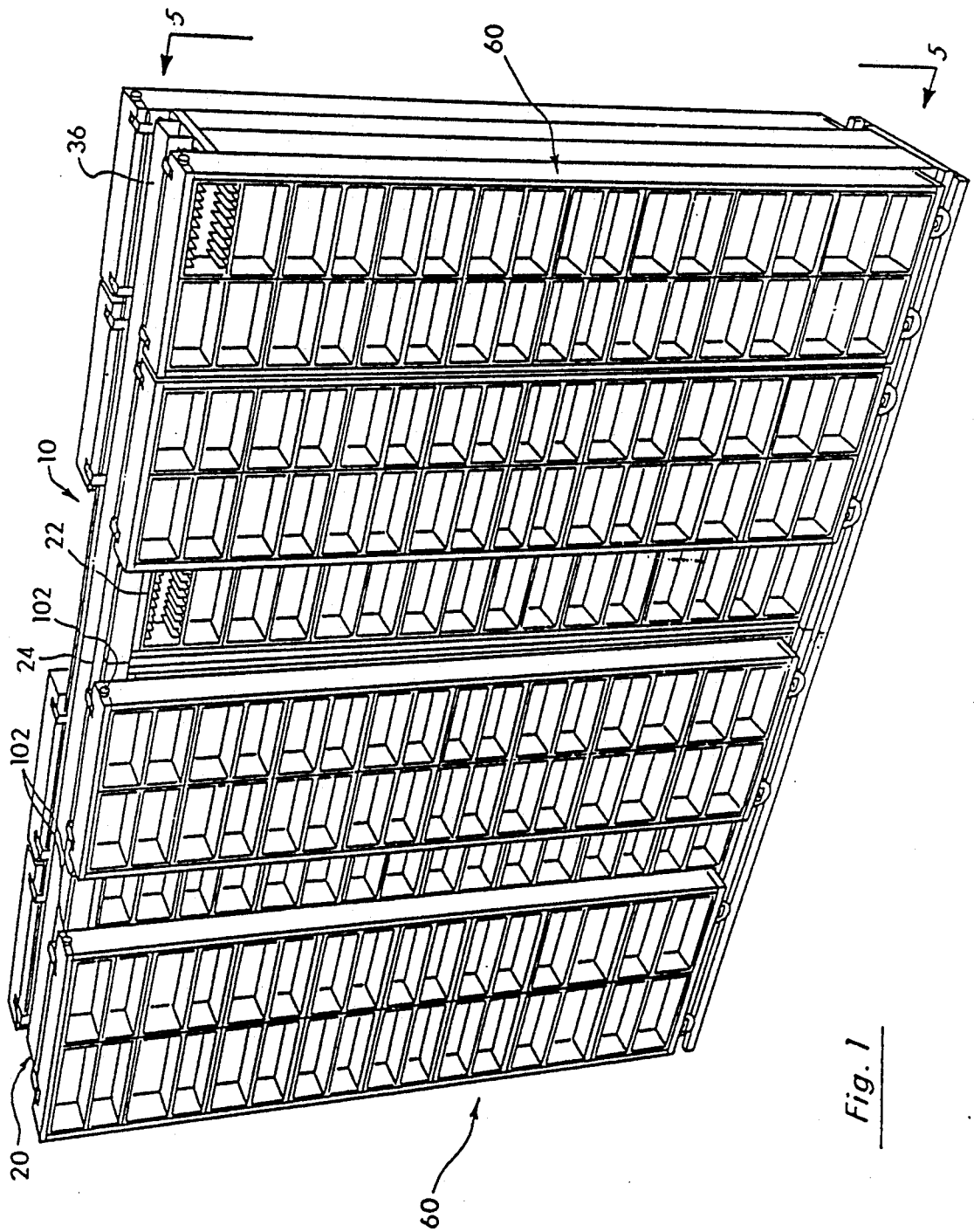
FIG. 1 is a perspective view of a preferred embodiment of the data cartridge storage system of the present invention.
Figure 2:
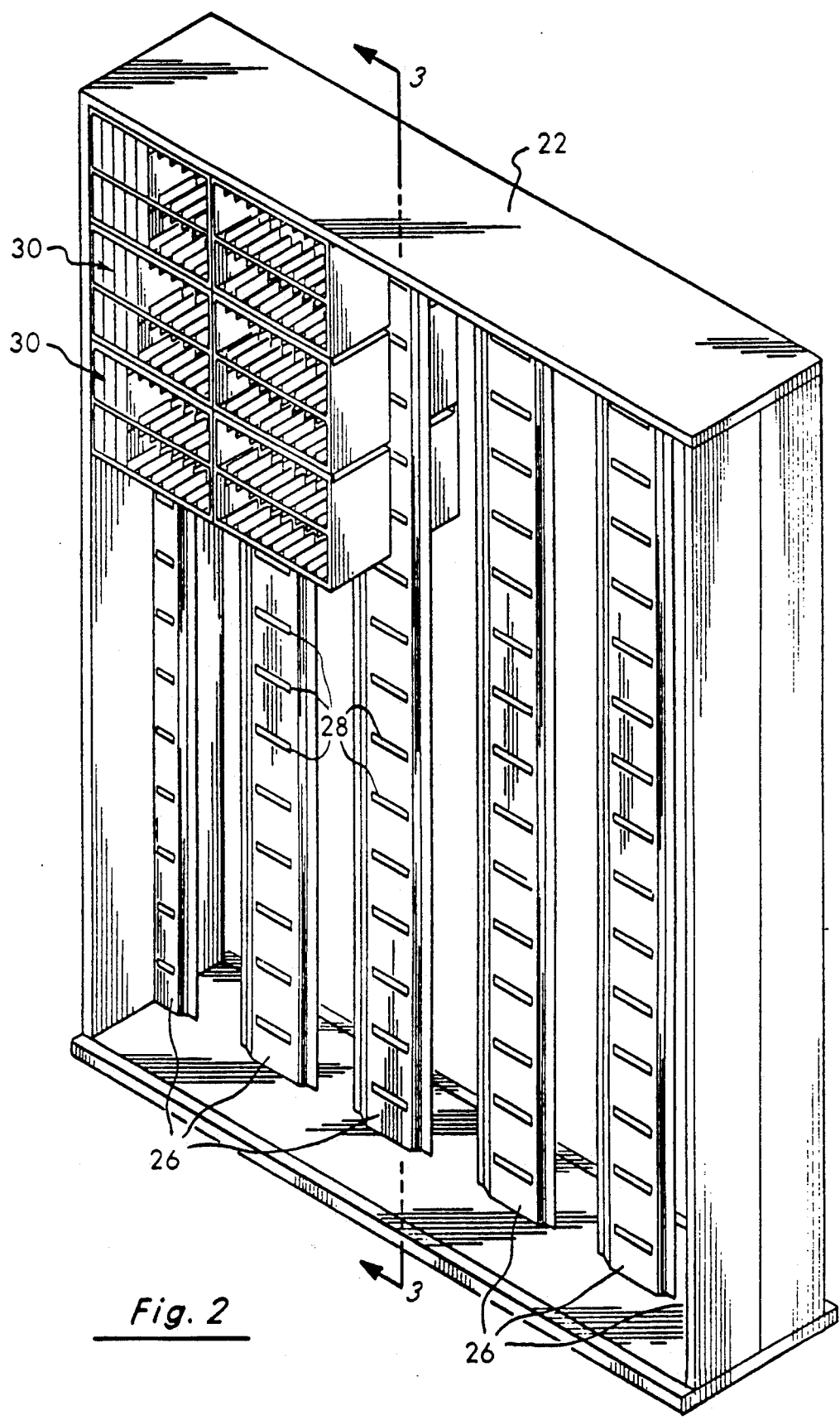
FIG. 2 is a perspective view of a center rack used in the present invention.
Figure 3:
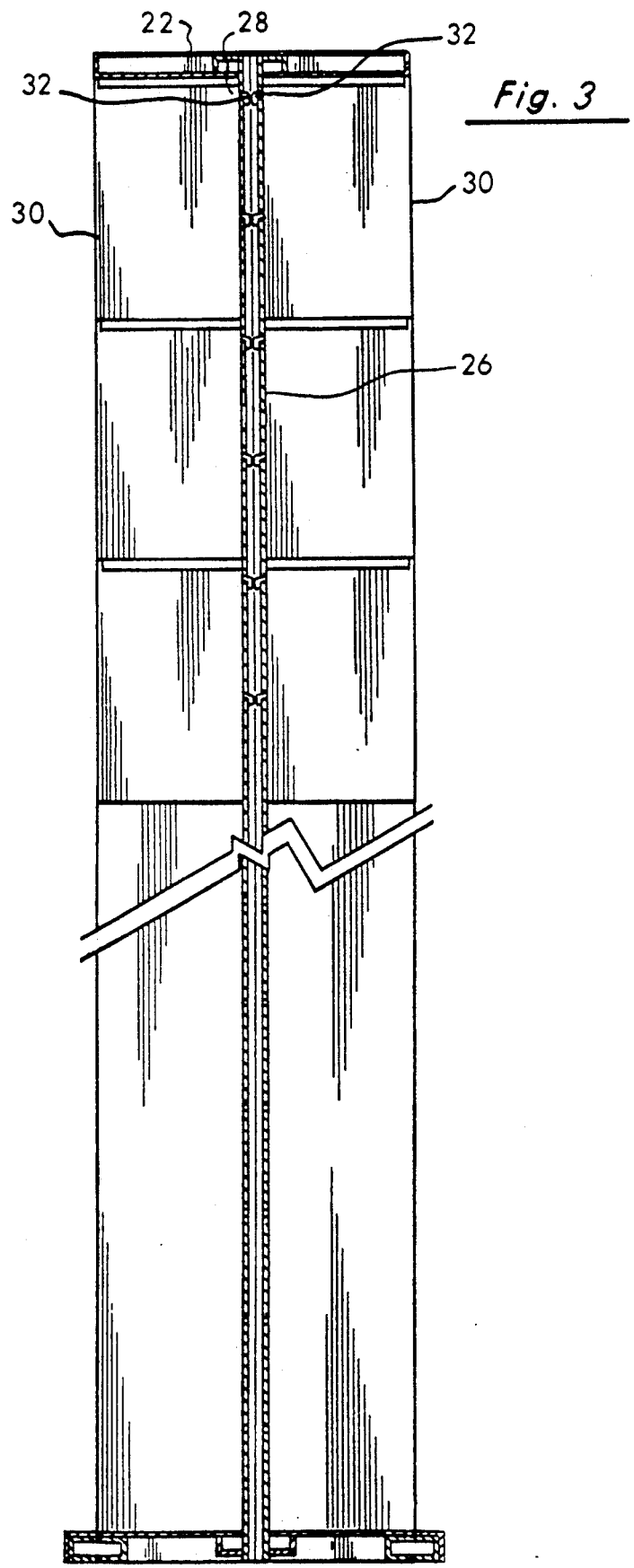
FIG. 3 is a cross-sectional view of FIG. 2 along lines 3—3.

Storage rack system 10, shown in FIG. 1, includes center storage rack 20. Center storage rack includes a pair of racks 22, 24, of a type disclosed in parent application Ser. No. 07/679,796. Rack 22, shown in FIG. 2, exemplifies this type of rack. It is to be understood that the present invention is not limited to the details of this rack but includes other racks within the ability of one skilled in the art. Rack 22, shown in FIGS. 2 and 3, has a plurality of vertically extending support members 26 spaced from one another in the center of rack 22. Each of support members 26 includes a plurality of spaced parallel apertures 28 on opposing sides of support members 26. Tape cartridge holders 30 are supported on support members 26 only by suspension hooks 32, shown in FIG. 3, inserted into apertures 28 on support members 26. Thus, a plurality of tape cartridge holders 30 are supported on rack 20 in close proximity to one another. Each tape cartridge holder 30 contains a plurality of tape cartridges therein. In the preferred embodiment, each tape cartridge holder stores twenty (20) tape cartridges and each center rack 22 supports forty (40) tape cartridge holders on each side of center rack 22. Therefore each center rack 22 can store up to sixteen hundred (1600) tape cartridges in the descriptive embodiment. In the embodiment shown in FIG. 1, center rack 20 has a capacity of thirty-two hundred (3200) tape cartridges.

Figure 4:
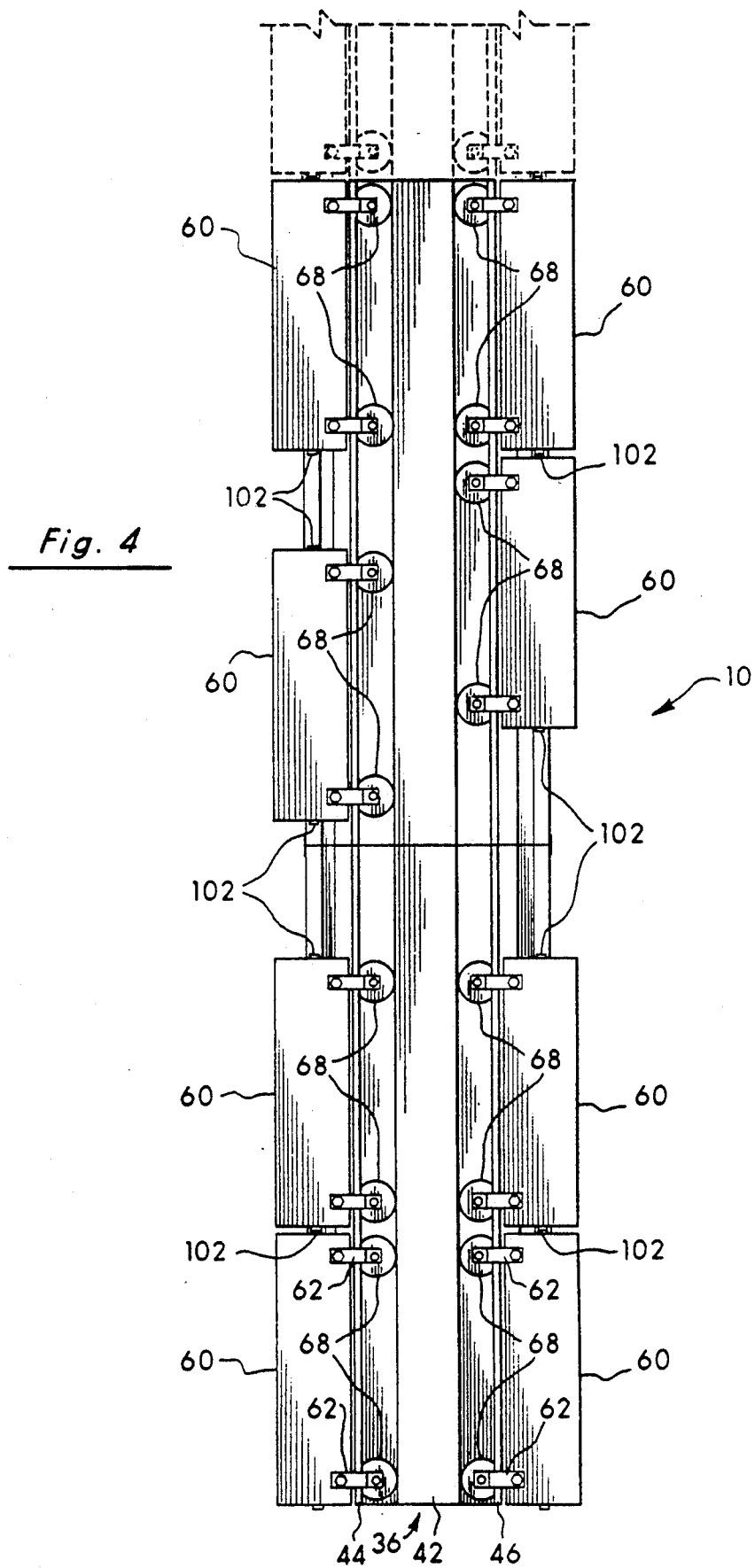
FIG. 4 is a top view of the embodiment of Figure.

Storage rack system 10 of the present invention, as shown in FIG. 4, further includes upper roller guide 36 having upstanding walls 38, 40, shown in FIG. 5, spaced from center support 42 at a predetermined width according to the diameter of upper rollers, described below. Upper roller guide 36 is affixed to the upper surface of center rack 20 by conventional techniques, such as bolting or spot-welding. Each wall 38, 40 includes lip portions 44, 46 respectively, extending over upper roller guide 36. The spacing between center support 42 and walls 38, 40 form upper roller guides as discussed in detail below.

Figure 5:
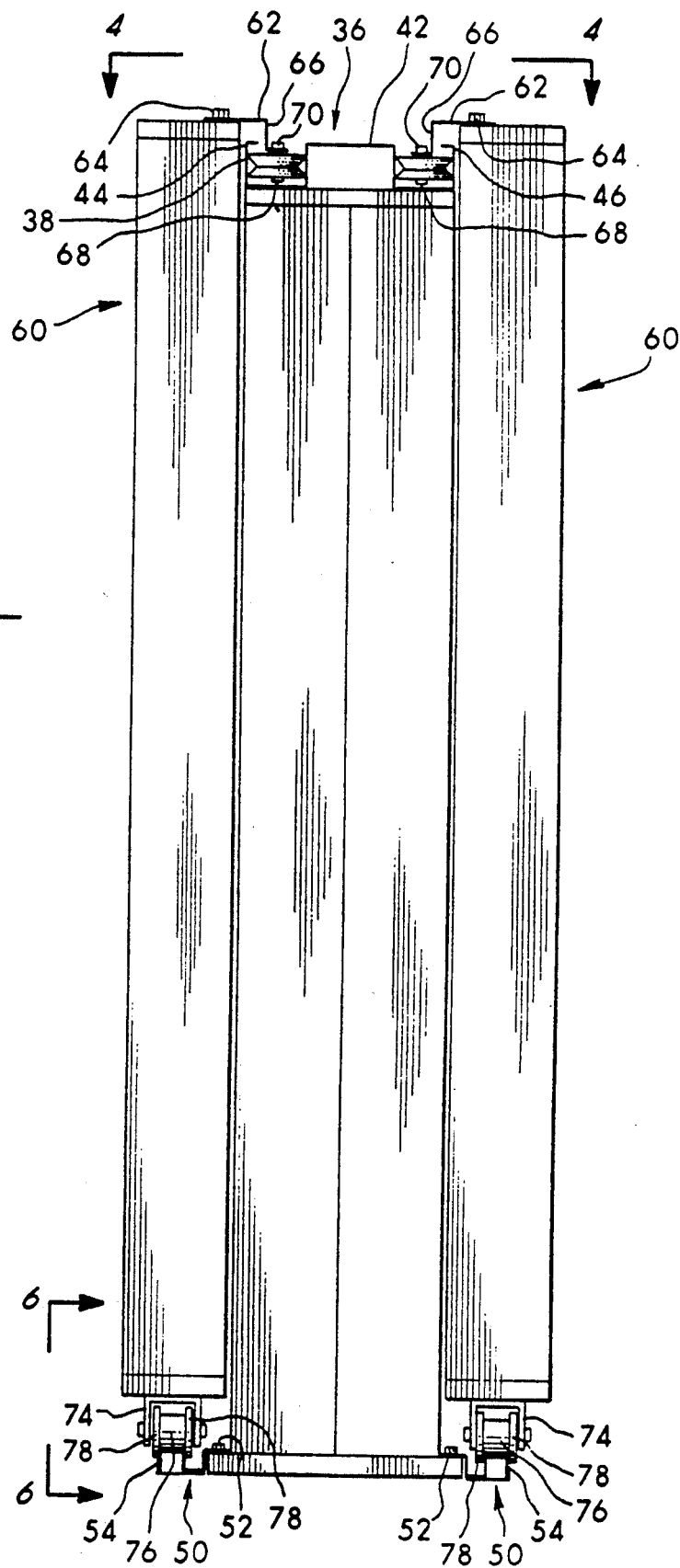
FIG. 5 is an end view of the embodiment of FIG. 1.
Figure 6:
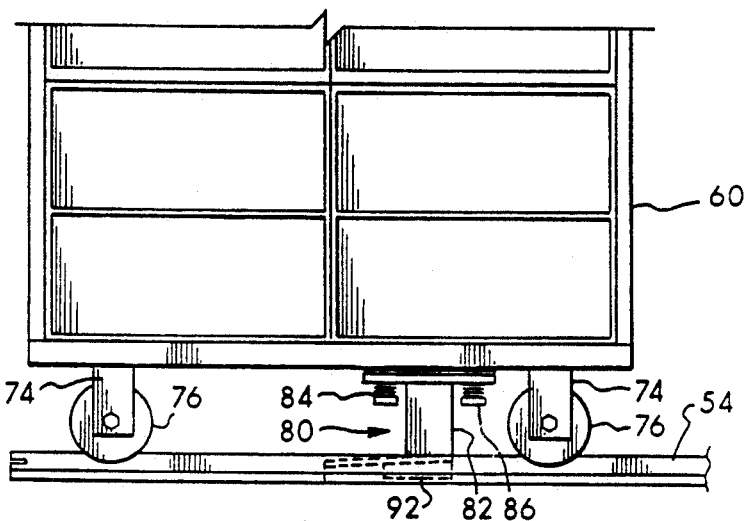
FIG. 6 is a view of the lower end of a movable rack of the embodiment of FIG. 1.

Lower extension member 50, also shown in FIG. 5, is secured to the lower end of center rack 20 by bolts 52. Lower extension member 50 includes upstanding roller guide track 54 spaced from the base of center rack 20. Guide track 54 is approximately the width of lower rollers described below.

Movable racks 60 are mounted in storage rack system 10 for movement relative to center rack 20. In the embodiment shown in FIG. 1, there are four movable racks 60 mounted for movement relative to center rack 20 on each side of center rack 20. Movable racks 60 are designed similar to center rack 20. Vertically extending support members, similar to members 26, are affixed near the rear of movable racks 60. Apertures are formed in the support members for tape cartridge holders to be affixed therein. Each movable rack 60 includes a width sufficient to mount two tape cartridge holders side by side and a height sufficient to mount eight tape cartridges high. This adds an additional capacity of two thousand five hundred sixty (2560) tape cartridges to the systems shown in FIG. 1 for a total capacity of five thousand seven hundred sixty (5760) tape cartridges.

This configuration allows access to one column of tape cartridge holders in center rack 20. Movable racks 60 are movable, as discussed below, to allow any one the columns of tape cartridge holders in center rack 20 to be accessible. Other configurations of center rack 20 and movable racks 60 are considered to be within the scope of the invention. For instance, an additional single width movable rack could be added to afford additional storage while still allowing the center rack to be accessed. Also, a single center rack 20 and two movable racks 60, one being wide enough for two tape cartridge holders and the other being wide enough for only one tape cartridge holder.

Each movable rack 60, shown in FIGS. 4 and 5, includes bracket 62 secured to the upper surface of movable rack 60 by bolt 64. Bracket 62 includes a downwardly extending portion 66 onto which roller 68 is secured by bolt 70. Rollers 68 are secured into upper roller guide 36 by lip portions 44, 46. Movable racks 60 are inserted into storage rack system 10 from the ends to allow rollers 68 into upper roller guides 36. Thus, rollers 68 are recessed below the plane of the upper surface of movable racks 60 to minimize the height of storage rack system 10.

U-shaped brackets 74 are affixed to the lower surface of each of movable racks 60 near the ends of each of movable racks 60 and in the center of movable racks 60. Rollers 76 are rotatably mounted in each bracket 74. Each roller 76 includes outer flanges 78 thereon. Rollers 76 engage upstanding roller guide track 54 as upper rollers 68 are engaged in guide 36 to support movable racks 60 for movement relative to center rack 20. Flanges 78 prevent rollers 76 from becoming misaligned on upstanding roller guide track 54.

Upper rollers 68 are recessed below the upper surface of movable racks 60 a distance equal to the distance movable racks 60 are raised due to lower rollers 76 and upstanding track 54. This allows each of movable racks 60 to contain the same number of tape cartridge holders as center rack 20 without substantially increasing the size of the system.

Movable racks 60 are mounted on opposing sides of center rack 20, as shown in FIGS. 1 and 5. Also, as shown in FIGS. 1 and 5, additional center racks 20 and movable racks 60 can be added onto storage rack system 10 simply by attaching the center racks end to end and providing additional upper roller guides and lower roller guides. The systems are designed to be aligned so that the movable racks can roll from center rack to center rack as desired.

Brakes are provided on the storage rack system to prevent damage from the movable rack systems striking the ends or sliding off the roller guides. Brake 80, shown in FIGS. 6-8, includes downwardly extending portion 82 secured to the lower surface of movable rack 60. Spring biased shoulder screws 84, 86, 88, 90 (all of which are not shown) resiliently secure brake 80 to movable rack 50. Lower end surface 92 on portion 82 includes brake pad 94 affixed thereto. Brake pad 94 is formed from a material, such as a fibrous braking material, that will frictionally engage a braking surface without metal to metal contact. Brake pad 94 tapers downwardly and outwardly from portion 82.

Figure 7:
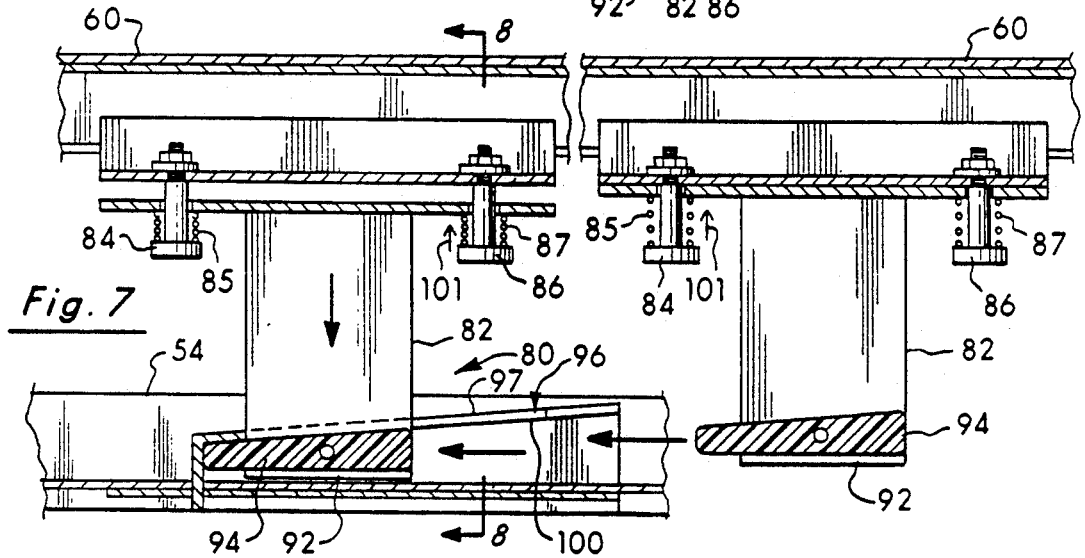
FIG. 7 is cross-sectional is a view of the movement of the brake mechanism.
Figure 8:
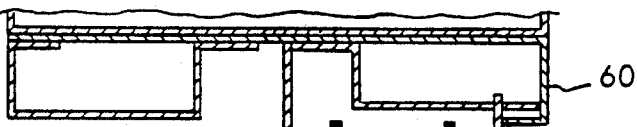
FIG. 8 is a cross-sectional end view of FIG. 7 along line 6—6.

Brake engaging member 96 is affixed on lower extension member 50 adjacent upstanding track portion 54 near the ends of storage rack system 10. Brake engaging member 96 includes groove 98 formed therein on upper engaging surface 100. Groove 98 is slightly wider than brake portion 82 and aligned therewith. Upper engaging surface 100 tapers downwardly as shown in FIG. 7.

In operation, as brake portion 82 enters into groove 98, brake pad 94 frictionally engages against upper engaging surface 100 to slow the travel of movable rack 60. The further brake portion 82 enters into brake engaging member 96, the more brake pad surface contacts engaging surface 100. The tapered surfaces of brake pad 94 and engaging surface 100 also increase frictional pressure to stop the movable rack. Also, the tapered surfaces of brake pad 94 and engaging surface 100 pull shoulder bolts 82-88 downward against the spring mounting. This provides an additional braking force from the compressed springs. This resilient biasing of brake 80 relative to movable rack 60 prevents sudden stopping of movable rack which might lead to damage.

Resilient bumpers 102, such as rubber stops, are mounted near the top of the side walls of movable racks 60. Bumpers 102 provide damping between the movable racks to reduce damage due to collision of the movable racks with one another.

Storage rack system 10 is easily adaptable to be configured to fit the needs and site conditions of the user. Additional center racks 20 can be affixed end to end along with corresponding lower extension members 50 and upper roller guides 36. Also, lower extension members 50 and upper roller guides 36 can be mounted on both sides of the center racks. Movable racks 60 are then inserted into upper roller guides 36 and onto lower track 54. Since movable racks 60 can be moved along these guides regardless the number of center racks used, the size and number of movable racks can be chosen for convenience, as long as at least one column of tape cartridge holders supported on the center racks is exposed.

Brake engaging members 96 are mounted near the end of travel of the movable racks on the outermost lower extension members. The outer movable racks include brake members 80 affixed so that lower brake surfaces 92 extend towards the outer ends of the rack system. This prevents damage due to the movable racks sliding off the rack system 10 as well as providing damping to the racks. Bumpers 102 provide damping for the inner movable racks to reduce collision damage of the movable racks against one another.

Tape cartridge holders 30 are filled with tape cartridges to be inserted and removed on center racks 22, 24 through the spaces between movable rack. When it is necessary to access another column on the center racks, the movable racks 50 are moved along the guides to allow exposure of another column. Movable racks 50 can be configured in a single column width, double column width or triple column width according to the needs of the user. The ability to expand through addition of more center racks and to mount movable racks on both sides of the center racks provides improved storage capacity without significantly increasing the physical space necessary as did previous rack systems. The use of the recessed upper rollers provides increased capacity with only nominal increase in the size of the systems. Also, the use of the novel braking system reduces the possibility of damage to either the system or the tape cartridges.

Thus, the present invention provides a high density storage system for storing data cartridges. This system increases the storage capacity of an area without increasing the need for additional physical space. It is to be expressly understood that this description of one possible preferred embodiment is not meant to limit the scope of the claimed inventive concept. Other variations and embodiments are considered to be within the claimed inventive concept.

We claim:

1. A storage rack system for storing magnetic media data storage tape cartridges, said storage rack system comprising:
   a plurality of removable tape cartridge holders for storing tape cartridges;
   a first stationary rack having an upper surface;
   a first bottom base support for supporting said first stationary rack;
   means on opposing sides of said first stationary rack for holding said tape cartridge holders on each of said opposing sides said first stationary rack;
   an upper track affixed to the upper surface of said first stationary rack for receiving rollers;
   a lower track affixed to said first bottom base support for receiving rollers;
   a second stationary rack having an upper surface;
   a second bottom base support for supporting said second stationary rack in an adjacent side-by-side relationship with said first stationary rack;
   means on opposing sides of said second stationary rack for holding said tape cartridge holders on each of said opposing sides of said second stationary rack;
   an upper track affixed to said upper surface of said second stationary rack for receiving rollers;
   a lower track on said second bottom base support for receiving rollers;
   a first movable rack;
   means on said first movable rack for supporting tape cartridge holders;
   upper rollers mounted on said first movable rack for engaging said upper track on said first stationary rack and said upper track on said second stationary rack; and
   lower rollers mounted on said first movable rack for engaging said lower track on said first stationary rack and said lower track on said second stationary rack for linear movement of said first movable rack in parallel directions relative to said first stationary rack and said second stationary rack.

2. A storage rack system for storing magnetic media data storage tape cartridges, said storage rack system comprising:
   a plurality of removable tape cartridge holders for storing tape cartridges;
   a first stationary rack having an upper surface;
   a first bottom base support for supporting said first stationary rack;
   means on said first stationary rack for supporting said removable tape cartridge holders;

a first upper track affixed to the upper surface of said first stationary rack for receiving rollers;

a second upper track affixed to said upper surface of said first stationary rack on the opposing side from said first upper track for receiving rollers;

a first lower track affixed to said first bottom base support for receiving rollers;

a second lower track affixed to said first bottom base support on the opposing side of said first lower track for receiving rollers;

a second stationary rack having an upper surface;

a second bottom base support for supporting said second stationary rack in an adjacent side-by-side relationship with said first stationary rack;

means on said second stationary rack for supporting said removable tape cartridge holders;

a first upper track affixed to said upper surface of said second stationary rack for receiving rollers;

a second upper track affixed to said upper surface of said second stationary rack on the opposing side of said first upper track for receiving rollers;

a first lower track on said second bottom base support for receiving rollers;

a second lower track on said second bottom base support on the opposing side of said first lower track for receiving rollers;

a first movable rack;

means on said first movable rack for supporting tape cartridge holders;

upper rollers mounted on said first movable rack for engaging said upper track on said first stationary rack and said upper track on said second stationary rack; and lower rollers mounted on said first movable rack for engaging said first lower track on said first stationary rack and said first lower track on said second stationary rack for linear movement of said first movable rack in parallel directions relative to said first stationary rack and said second stationary rack;

a second movable rack;

means on said second movable rack for supporting tape cartridge holders;

upper rollers mounted on said second movable rack for engaging said second upper track on said first stationary rack and said second upper track on said second stationary rack; and lower rollers mounted on said second movable rack for engaging said second lower track on said first stationary rack for linear second lower track on said second stationary rack for linear movement of said second movable rack in parallel directions relative to said first stationary rack and said second stationary rack and on the opposing side of said first movable rack.

3. The storage system of claim 1 wherein said storage system includes:

means for stopping the movement of said first movable rack beyond a predetermined point.

4. The storage system of claim 1 wherein said storage system includes:

said upper track of said first stationary rack having a roller-engageable channel track;

said upper track of said second stationary rack having a roller-engageable channel track; and said first moveable rack includes a member for supporting said upper rollers for engagement in said roller-engageable track of said first stationary rack and in said roller-engageable channel track of said second stationary rack.

5. The storage rack system of claim 4 wherein said storage rack system includes:

open-ends on said roller-engageable channel track on said first stationary rack and on said roller-engageable channel track on said second stationary to allow the insertion of said upper rollers on said first moveable rack.

6. The storage rack system of claim 1 wherein said storage rack system includes:

a narrow raised portion on said bottom base support of said first stationary rack;

a narrow raised portion on said bottom base support of said second stationary rack;

and said lower rollers including a peripherally grooved section for engagement on said narrow-raised portion of said bottom base support of said first stationary rack and said narrow raised portion on said bottom base support of said second stationary rack.

7. The storage rack system of claim 1 wherein said storage rack system further includes:

a plurality of movable racks;

means on each of said plurality of movable racks for supporting tape cartridge holders;

upper rollers mounted on each of said movable racks for engaging said upper track on said first stationary rack and said upper track on said second stationary rack; and lower rollers mounted on each of said movable racks for engaging said lower track on said first stationary rack for linear movement of each of said movable racks in parallel directions relative to said first stationary rack and said second stationary rack.

8. The storage rack system of claim 1 wherein said storage rack system further includes:

additional stationary racks;

each of said additional stationary racks having an upper surface;

bottom base supports for supporting each of said additional stationary racks;

means on each of said stationary racks for supporting said removable tape cartridge holders;

an upper track affixed to the upper surface of each of said additional stationary racks for receiving rollers;

a lower track affixed to each of said bottom base supports for receiving rollers; and said upper rollers mounted on said first movable rack engage said upper track on each of said stationary racks; and said lower rollers mounted on said first movable rack engage said lower track on each of said stationary racks for linear movement of said first movable rack in parallel directions relative to each of said stationary racks.

9. A storage rack system for storing tape cartridges, said storage rack system comprising:

a plurality of stationary racks;

each of said stationary racks having an upper surface;

bottom base supports for supporting each of said stationary racks;

means on opposing sides of each of said stationary racks for holding tape cartridge holders on each of said opposing sides of said stationary racks;

an upper track affixed to the upper surface of each of said stationary racks for receiving rollers;

a lower track affixed to said bottom base supports for receiving rollers;

a first movable rack;

means on said first movable rack for supporting tape cartridge holders;

upper rollers mounted on said first movable rack for engaging said upper tracks on each of said stationary racks; and lower rollers mounted on said first movable rack for engaging said lower track on each of said stationary racks for linear movement of said first movable rack in parallel directions relative to each of said stationary racks.

10. A storage rack system for storing tape cartridges, said storage rack system comprising:

a plurality of stationary racks;

each of said stationary racks having an upper surface;

bottom base supports for supporting each of said stationary racks;

means on each of said stationary racks for supporting removable tape cartridge holders;

a first upper track affixed to the upper surface of each of said stationary racks for receiving rollers;

a second upper track affixed to the upper surface of each of said stationary racks on the opposing side from said first upper track for receiving rollers;

a first lower track affixed to said bottom base supports for receiving rollers;

a second lower track affixed to said bottom base supports on the opposing side of said first lower track for receiving rollers;

a first movable rack;

means on said first movable rack for supporting tape cartridge holders;

upper rollers mounted on said first movable rack for engaging said first upper tracks on each of said stationary racks; and lower rollers mounted on said first movable rack for engaging said lower track on each of said stationary racks for linear movement of said first movable rack in parallel directions relative to each of said stationary racks;

a second movable rack;

means on said second movable rack for supporting tape cartridge holders;

upper rollers mounted on said second movable rack for engaging said second upper tracks on each of said stationary racks; and lower rollers mounted on said second movable rack for engaging said second lower tracks on each of said stationary racks for linear movement of said second movable rack in parallel directions relative to each of said stationary racks on the opposing side of said first movable rack.

11. The storage system of claim 9 wherein said storage system includes:

means for stopping the movement of said first movable rack beyond a predetermined point.

12. The storage system of claim 9 wherein said storage system includes:

said upper track of each of said stationary racks having a roller-engageable channel track; and said first moveable rack includes a member for supporting said upper rollers for engagement in said roller-engageable track of each of said stationary racks.

13. The storage rack system of claim 12 wherein said storage system further includes:

open-ends on said roller engageable channel track on each of said stationary racks for insertion of said upper rollers of said first moveable rack.

14. The storage rack system of claim 9 wherein said storage rack system includes:

a narrow raised portion on said bottom base supports;

and said lower rollers including a peripherally grooved section for engagement on said narrow-raised portion of said bottom base supports.

15. The storage rack system of claim 9 wherein said storage rack system further includes:

a plurality of movable racks;

means on each of said plurality of movable racks for supporting tape cartridge holders;

upper rollers mounted on each of said movable racks for engaging said upper track on each of said stationary racks; and lower rollers mounted on each of said movable racks for engaging said lower track on each of said stationary racks for linear movement of each of said movable racks in parallel directions relative to each of said stationary racks.

* * * * *

REEXAMINATION CERTIFICATE (2650th)

United States Patent [19]
Price, Jr. et al.

[11] B1 5,265,739
[45] Certificate Issued Aug. 8, 1995

[54] DOUBLE DENSITY STORAGE RACK SYSTEM FOR DATA TAPE CARTRIDGES

[75] Inventors: Macy J. Price, Jr., Louisville; Laurence G. Ball, Denver; Andrew W. Wildhaber, Thornton, all of Colo.

[73] Assignee: Engineered Data Products Incorporated, Broomfield, Colo.

Reexamination Request:
No. 90/003,503, Jul. 21, 1994

Reexamination Certificate for:
Patent No.: 5,265,739
Issued: Nov. 30, 1993
Appl. No.: 6,431
Filed: Jan. 21, 1993

Related U.S. Application Data

[63] Continuation of Ser. No. 786,087, Oct. 31, 1991, Pat. No. 5,193,696, which is a continuation-in-part of Ser. No. 679,796, Apr. 3, 1991, abandoned, which is a continuation-in-part of Ser. No. 551,131, Jul. 6, 1990, Pat. No. 5,072,838, which is a continuation-in-part of Ser. No. 343,952, Apr. 26, 1989, abandoned.

[51] Int. Cl.$^6$ ............................................. A47F 5/00
[52] U.S. Cl. ...................................... 211/162; 211/41; 312/201
[58] Field of Search .................. 211/41, 189, 208, 88, 211/103, 190, 192, 162; 312/8, 15, 10, 12, 201, 198, 245, 246; 206/387; 248/221.3; 188/40, 63, 62; 16/DIG. 16, DIG. 20

[56] References Cited

PUBLICATIONS

Supreme Equipment & Systems Corp. "Roll-a-way Thinline Assembly Instructions", Jul. 1977, Wright Line Exhibit 189.
Supreme Equipment & Systems Corp. "Assembly Instructions roll-away thinline ® bi-file tri-file", 1987, Wright Line Exhibit 190.
Supreme Equipment & Systems Corp. brochure, "Thin-Line Roll-Away Bi-file/Tri-file", 1980, Wright Line Exhibit 192.
Supreme Equipment & Systems Corp. brochure, "Roll-away Thinline ® Bi-file/Tri-file", 1981, Wright Line Exhibit 193.
Supreme Equipment & Systems Corp. Price List TL-183, 1983, Wright Line Exhibit 194.
The Winsted Corporation, 1985 Winsted Matchmaker Systems catalog, front cover and pp. 67, 74–75.

*Primary Examiner*—Blair M. Johnson

[57] ABSTRACT

A storage rack system for providing high density storage of data cartridges. The storage rack system includes high density center racks having storage capability on opposing sides of the racks. Movable racks having upper rollers recessed below the plane of the upper surface of the movable racks and lower rollers are mounted on the system on both sides of the center racks. The movable racks allow access to at least one column of tape cartridge holders supported on the center racks. Brake members are resiliently mounted on the lower surfaces of the outer movable racks enabling the movable members to come to a complete stop without excessive jarring of the racks or tape cartridge holders.

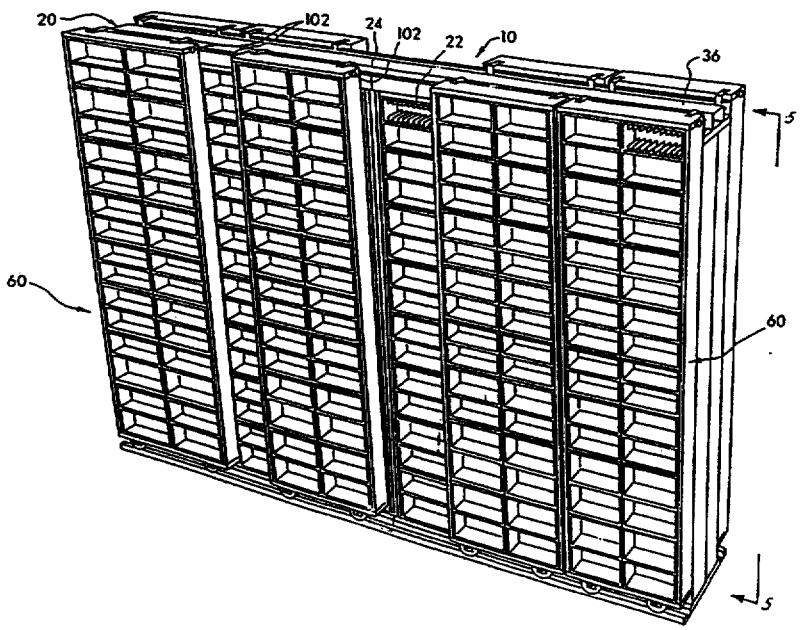

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 9, 10 are determined to be patentable as amended.

Claims 3-8, 11-15, dependent on an amended claim, are determined to be patentable.

1. A storage rack system for storing magnetic media data storage tape cartridges, said storage rack system comprising:
   a plurality of removable tape cartridge holders for storing tape cartridges;
   a first stationary rack having an upper surface;
   a first bottom base support for supporting said first stationary rack;
   means on opposing sides of said first stationary rack for holding said tape cartridge holders on each of said opposing sides *of* said first stationary rack;
   an upper track affixed to the upper surface of said first stationary rack for receiving rollers;
   a lower track affixed to said first bottom base support for receiving rollers;
   a second stationary rack having an upper surface;
   a second bottom base support for supporting said second stationary rack in an adjacent side-by-side relationship with said first stationary rack;
   means on opposing sides of said second stationary rack for holding said tape cartridge holders on each of said opposing sides of said secondary stationary rack;
   an upper track affixed to said upper surface of said second stationary rack for receiving rollers;
   a lower track on said second bottom base support for receiving rollers;
   a first movable rack;
   means on said first movable rack for supporting tape cartridge holders;
   upper rollers mounted on said first movable rack for engaging said upper track on said first stationary rack and said upper track on said second stationary rack; and
   lower rollers mounted on said first movable rack for engaging said lower track on said first stationary rack and said lower track on said second stationary rack; *thereby providing* for linear movement of said first movable rack *from said first stationary rack to said second stationary rack* in parallel directions relative to said first stationary rack and said second stationary rack.

2. A storage rack system for storing magnetic media data storage tape cartridges, said storage rack system comprising:
   a plurality of removable tape cartridge holders for storing tape cartridges;
   a first stationary rack having an upper surface;
   a first bottom base support for supporting said first stationary rack;
   means on said first stationary rack for supporting said removable tape cartridge holders;
   a first upper track affixed to the upper surface of said first stationary rack for receiving rollers;
   a second upper track affixed to said upper surface of said first stationary rack on the opposing side from said first upper track for receiving rollers;
   a first lower track affixed to said first bottom base support for receiving rollers;
   a second lower track affixed to said first bottom base support on the opposing side of said first lower track for receiving rollers;
   a second stationary rack having an upper surface;
   a second bottom base support for supporting said second stationary rack in an adjacent side-by-side relationship with said first stationary rack;
   means on said second stationary rack for supporting said removable tape cartridge holders;
   a first upper track affixed to said upper surface of said second stationary rack for receiving rollers;
   a second upper track affixed to said upper surface of said second stationary rack on the opposing side of said first upper track for receiving rollers;
   a first lower track on said second bottom base support for receiving rollers;
   a second lower track on said second bottom base support on the opposing side of said first lower track for receiving rollers;
   a first movable rack;
   means on said first movable rack for supporting tape cartridge holders;
   upper rollers mounted on said first movable rack for engaging said upper track on said first stationary rack and said upper track on said second stationary rack; and
   lower rollers mounted on said first movable rack for engaging said first lower track on said first stationary rack and said first lower track on said second stationary rack; *thereby providing* for linear movement of said first movable rack *from said first stationary rack to said second stationary rack* in parallel directions relative to said first stationary rack and said second stationary rack;
   a second movable rack;
   means on said second movable rack for supporting tape cartridge holders;
   upper rollers mounted on said second movable rack for engaging said second upper track on said first stationary rack and said second upper track on said second stationary rack; and
   lower rollers mounted on said second movable rack for engaging said second lower track on said first stationary rack [for linear] *and said* second lower track on said second stationary rack; *thereby providing* for linear movement of said second movable rack *from said first stationary rack to said second stationary rack* in parallel directions relative to said first stationary rack and said second stationary rack and on the opposing side of said first movable rack.

9. A storage rack system for storing tape cartridges, said storage rack system comprising:
   a plurality of stationary racks;
   each of said stationary racks having an upper surface;

bottom base supports for supporting each of said stationary racks;

means on opposing sides of each of said stationary racks for holding tape cartridge holders on each of said opposing sides of said stationary racks;

an upper track affixed to the upper surface of each of said stationary racks for receiving rollers;

a lower track affixed to said bottom base supports for receiving rollers;

a first movable rack;

means on said first movable rack for supporting tape cartridge holders;

upper rollers mounted on said first movable rack for engaging said upper tracks on each of said stationary racks; and lower rollers mounted on said first movable rack for engaging said lower track on each of said stationary racks; *thereby providing* for linear movement of said first movable rack *from one of said stationary racks to another* in parallel directions relative to each of said stationary racks.

10. A storage rack system for storing tape cartridges, said storage rack system comprising:

a plurality of stationary racks;

each of said stationary racks having an upper surface;

bottom base supports for supporting each of said stationary racks;

means on each of said stationary racks for supporting removable tape cartridge holders;

a first upper track affixed to the upper surface of each of said stationary racks for receiving rollers;

a second upper track affixed to the upper surface of each of said stationary racks on the opposing side from said first upper track for receiving rollers;

a first lower track affixed to said bottom base supports for receiving rollers;

a second lower track affixed to said bottom base supports on the opposing side of said first lower track for receiving rollers;

a first movable rack;

means on said first movable rack for supporting tape cartridge holders;

upper rollers mounted on said first movable rack for engaging said first upper tracks on each of said stationary racks; and lower rollers mounted on said first movable rack for engaging said lower track on each of said stationary racks; *thereby providing* for linear movement of said first movable rack *from one of said stationary racks to another* in parallel directions relative to each of said stationary racks;

a second movable rack;

means on said second movable rack for supporting tape cartridge holders;

upper rollers mounted on said second movable rack for engaging said second upper tracks on each of said stationary racks; and lower rollers mounted on said second movable rack for engaging said second lower tracks on each of said stationary racks; *thereby providing* for linear movement of said second movable rack *from one of said stationary racks to another* in parallel directions relative to each of said stationary racks on the opposing side of said first movable rack.

* * * * *